W. THOMSON & J. A. MORRICE.
MANUFACTURE OF MODIFIED STARCH.
APPLICATION FILED AUG. 9, 1907.
951,666.
SPECIMENS.
Patented Mar. 8, 1910.
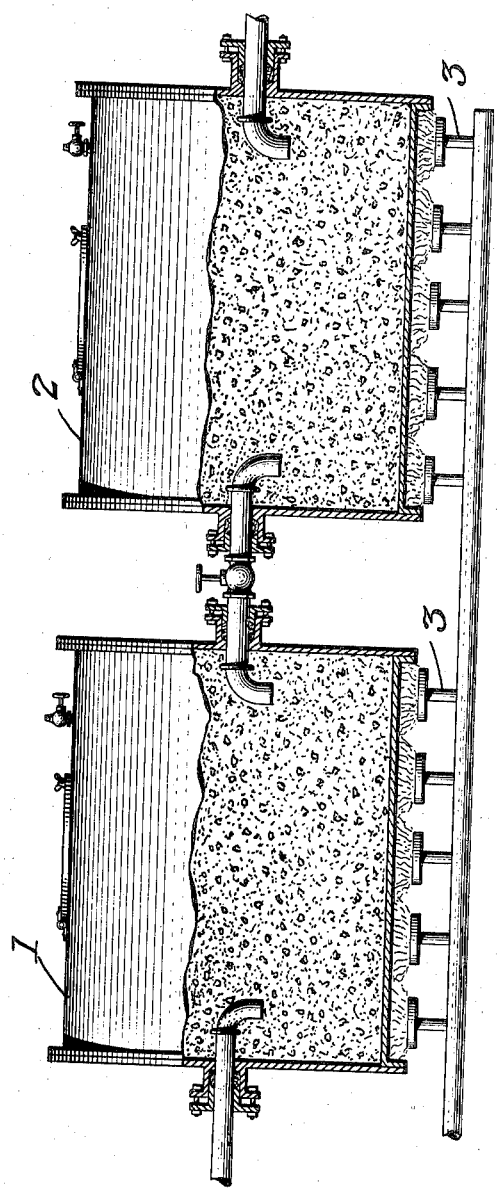

UNITED STATES PATENT OFFICE.

WILLIAM THOMSON, OF MANCHESTER, ENGLAND, AND JAMES ANDERSON MORRICE, OF GLASGOW, SCOTLAND.

MANUFACTURE OF MODIFIED STARCH.

951,666.

Specification of Letters Patent.  Patented Mar. 8, 1910.

Application filed August 9, 1907.  Serial No. 387,937.  (Specimens.)

*To all whom it may concern:*

Be it known that we, WILLIAM THOMSON, of Manchester, England, and JAMES ANDERSON MORRICE, of Glasgow, Scotland, subjects of the King of Great Britain, have invented new and useful Improvements in the Manufacture of Modified Starch, of which the following is a specification.

The general object of our invention is to produce a modified starch by the treatment of any ordinary starch in a manner substantially as hereinafter described; the starch after such treatment becoming modified so that when mixed with water and heated it will dissolve and form a much thinner paste than will the original starch, and be suitable for sizing, finishing or other purposes.

In carrying out our invention we put starch of any kind into a vessel adapted to be closed air-tight, and thereafter introduce to such vessel sulfur dioxid gas, and heat the starch under the requisite pressure to a suitable temperature, say about 104° centigrade, when the starch under the influence of the gas and heat and pressure will become modified as above stated, forming a substance afterward soluble as stated and suitable for various uses.

In order to give a clear understanding of the method herein claimed, we have shown and outlined a description of an apparatus suitable for practicing such method; which apparatus forms no part of our present invention but may constitute the subject matter of a separate application. For considerations of rapidity and economy in production this method may be carried out under an alternately acting system herein described, although our invention is not intended to be restricted to such.

The drawing represents the apparatus partly in sectional elevation.

We preferably employ for holding the starch two revolving cylinders 1, 2, made of welded steel and lined with sheet lead. The starch having been placed in the cylinders they may be heated to the required temperature by rows of gas jets 3 or otherwise. We exhaust the whole or a part of the air from one cylinder, as that 1, and thereafter introduce thereto sulfur dioxid gas until it is full or nearly full; *i. e.* until it comes to, or within a few pounds to the square inch of, the pressure of the atmosphere, or until it is above atmospheric pressure. The gas is then heated to obtain a pressure of from 4 to 5 pounds to 20 or more pounds to the square inch, and the heating continued at any suitable temperature between, say 100° and 105° centigrade, in the cylinder 1, that is to say, the first one of the two revolving cylinders used in carrying out the alternate action herein described. In from 15 minutes to one, two or more hours depending upon the temperature and pressure, and also upon the quantity of starch operated upon, the starch becomes modified to the necessary state. The sulfur dioxid is then allowed to pass as from the cylinder 1, which alone has been heated, to the other revolving cylinder 2, which has already been charged with starch and exhausted of air, and the residual sulfur dioxid gas is pumped from the first employed cylinder and delivered into the other one, which should then be heated. The same gas or a part of it is, in this alternate operation, used over and over again, and the starch left modified without appreciable additional acidity. Any suitable means for rotating the cylinders may be used. The product is modified starch which is insoluble in cold or in warm water, but soluble in water at or near the boiling point; it differing, therefore, in this respect from dextrins or sugars which are soluble in cold or warm water.

We are familiar with the Classen process. It in no way affects ours because at 180° Fah. starch is not converted into soluble starch; and Classen achieves his object as he says by afterward subjecting the starch to the action of air or oxygen or some liquid containing oxygen, and he then says after being treated (in that way) the starch is again heated to 230°-285° Fah.

In our process we convert the starch into soluble starch directly and without further treatment, the starch being heated with sulfur dioxid to the temperature of 220° Fah. (104° centigrade) which effects the complete result which we desire of converting starch into the so called soluble starch, that being the technical term well known in England for a starch insoluble in cold but soluble in hot water. Classen also describes a process for converting cellulose into soluble starch and sugar. In that process the wood or other material is treated with water containing chlorin and afterward with sulfur dioxid. This is also a very different process from ours, and the remark is made by Percy Bean that neither of these processes has been successfully applied in practice, as they are too complicated, while our process is now successfully at work.

With regard to the term soluble starch being a misnomer because the starch is not soluble in cold water, it is not seen why this should be regarded as such. It is known as soluble starch because it dissolves in hot water, whereas ordinary starch does not dissolve in hot water but merely forms a gelatinous mixture from which it readily separates from solution after diluting and cooking.

Having thus described our invention, we claim:—

1. The method herein described of producing a modified starch, the same consisting in placing ordinary starch in a vessel, exhausting air from said vessel, introducing thereto sulfur dioxid gas, heating the confined gas whereby to obtain pressure, and continuing the heating at a suitable temperature, say between 100° and 105° centigrade, until the starch becomes modified, substantially as and for the purpose set forth.

2. The improved method herein described of producing a modified starch and re-utilizing the agency employed in effecting such modification, the same consisting in placing ordinary starch in a vessel, exhausting air from said vessel, introducing thereto sulfur dioxid gas, heating the confined gas whereby to obtain pressure, continuing the heating at a suitable temperature, say between 100° and 105° centigrade until the starch becomes modified as described, and transferring from said vessel to a vessel held in reserve, and in which a second charge of ordinary starch has been placed, the sulfur dioxid and the residual sulfur dioxid gas for a repetition of the operation, thus saving the gas and leaving the starch modified without appreciable additional acidity, substantially as and for the purpose set forth.

In testimony whereof we affix our signatures in the presence of two witnesses.

WILLIAM THOMSON.
JAMES ANDERSON MORRICE.

Witnesses:
  WM. HOLT,
  ERNEST SEARS.